United States Patent [19]
Jacobs et al.

[11] Patent Number: 6,078,509
[45] Date of Patent: Jun. 20, 2000

[54] MULTIPLE OUTPUT FLYBACK CONVERTER HAVING IMPROVED CROSS-REGULATION AND METHOD OF OPERATION THEREOF

[75] Inventors: Mark E. Jacobs, Dallas; Yimin Jiang; Vijayan J. Thottuvelil, both of Plano, all of Tex.

[73] Assignee: Lucent Technologies Inc., Murray Hill, N.J.

[21] Appl. No.: 09/193,081

[22] Filed: Nov. 16, 1998

[51] Int. Cl.[7] .................................................. H02M 3/335
[52] U.S. Cl. ................... 363/21; 363/56; 363/95
[58] Field of Search ............................... 363/20, 21, 26, 363/56, 97, 95, 131

[56] References Cited

U.S. PATENT DOCUMENTS

| | | | |
|---|---|---|---|
| 4,870,555 | 9/1989 | White | 363/21 |
| 5,173,847 | 12/1992 | Suzuki | 363/21 |
| 5,206,800 | 4/1993 | Smith | 363/21 |
| 5,235,502 | 8/1993 | Vinciarelli et al. | 363/20 |
| 5,519,599 | 5/1996 | Shinada et al. | 363/21 |
| 5,742,491 | 4/1998 | Bowman et al. | 363/21 |

*Primary Examiner*—Adolf Deneke Berhane

[57] ABSTRACT

For use with a flyback converter having a modulator for providing a main switch control signal thereto and main and cross-regulated output circuits, the cross-regulated output circuit subject to ringing and resulting voltage excursion, a voltage excursion controller and a method of operating the same. In one embodiment, the controller includes: (1) a delay circuit, coupled to the modulator, that generates a delay signal based on the main switch control signal and (2) an auxiliary switch, associated with the cross-regulated output circuit, that receives the delay signal and opens to isolate at least a portion of the ringing within said cross-regulated output circuit.

21 Claims, 3 Drawing Sheets

MULTIPLE OUTPUT FLYBACK CONVERTER HAVING IMPROVED CROSS-REGULATION AND METHOD OF OPERATION THEREOF

TECHNICAL FIELD OF THE INVENTION

The present invention is directed, in general, to power conversion and, more specifically, to a multiple output flyback converter having improved cross-regulation and a method of operating the same.

BACKGROUND OF THE INVENTION

Power converters are widely used to provide required voltages and load currents especially in environments that have higher concentrations of telecommunications or computer equipment. These power converters are often required to provide higher levels of output power for a small physical volume, since space is often at a premium. This requirement dictates that the power converters be high power density devices. These higher power density concentrations also dictate that the power converter operate with as high an efficiency as possible to minimize the converter's heat generation and therefore its operating temperature rise to the degree possible.

Through the use of switching regulator techniques, power converter efficiencies may be achieved that are typically higher than those of linear regulation techniques. These switching regulator techniques, however, give rise to other efficiency-decreasing problems that are not typically encountered in linear regulators. Because of higher switching frequencies (50 to 100 kilohertz), parasitic circuit inductance and capacitance elements in the transformers and switching devices cause "ringing" due to circuit resonances. This ringing typically presents both device and efficiency problems that must be addressed to operate the converters at high power densities.

The use of power converters that have multiple outputs allows several output voltage and current requirements to be accommodated by one converter. This is often accomplished through the use of multiple secondary transformer windings. Typically, the switching regulator is constrained to provide active regulation on just one of the outputs. Then, regulation of other outputs depends on a voltage reflection across the transformer of the main output regulation and is usually impacted by design parameters affecting the major components, such as a transformer. For example, if a main output regulation is about five percent, a secondary output regulation may only be on the order of ten percent.

The flyback converter is a very popular power supply topology for use in low-power, multiple output applications. When the main output voltage regulation requirement is moderate, these converters may be operated with the main output being regulated by the switching regulator and the other output (s) being "cross-regulated" as discussed above. The flyback converter is also attractive since its mode of operation allows the output circuits to be simplified in that an output inductor is not required. The output filter capacitor charges to the voltage delivered by the secondary output on each switching cycle. This arrangement normally works well for higher output load currents. However, for conditions of light output load currents, ringing associated with the switching regulator becomes significant and causes peak charging of the lightly loaded outputs. This ringing causes the regulation of the secondary output to deteriorate substantially, even to the point of being unacceptable.

Accordingly, what is needed in the art is a way to provide normal regulation for secondary outputs under light load conditions.

SUMMARY OF THE INVENTION

To address the above-discussed deficiencies of the prior art, the present invention provides, for use with a flyback converter having a modulator for providing a main switch control signal thereto and main and cross-regulated output circuits, the cross-regulated output circuit subject to ringing and resulting voltage excursion, a voltage excursion controller and a method of operating the same. In one embodiment, the controller includes: (1) a delay circuit, coupled to the modulator, that generates a delay signal based on the main switch control signal and (2) an auxiliary switch, associated with the cross-regulated output circuit, that receives the delay signal and opens to isolate at least a portion of the ringing within said cross-regulated output circuit.

The present invention therefore introduces the broad concept of isolating at least some of the ringing that occurs (usually under light load) in the cross-regulated output circuit of a flyback converter to moderate the voltage excursion that would otherwise result. In an embodiment to be illustrated and described, the voltage excursion circuit operates to isolate substantially all of the ringing, allowing the output voltage of the cross-regulated output circuit to remain within about 10% of the desired output voltage, even under light load conditions.

In one embodiment of the present invention, the delay circuit comprises a signal inverter that generates a signal complementary to the main switch control signal. The turn-on time of the complementary signal (1–d) is then delayed to provide the resulting delay signal.

In one embodiment of the present invention, the delay circuit provides a delay of fixed duration. Of course, some applications may benefit from a controllable delay, perhaps based on feedback of the ringing or on load current information.

In one embodiment of the present invention, the auxiliary switch is coupled between a diode and a capacitor of the cross-regulated output circuit. Those skilled in the pertinent art will perceive that the auxiliary switch can be located in other parts of the cross-regulated output circuit.

In one embodiment of the present invention, the modulator is a pulse-width modulator (PWM). Those skilled in the pertinent art will understand, however, that the delay circuit of the present invention is equally applicable to main switch control signals generated by other conventional or later-developed switch modulators.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
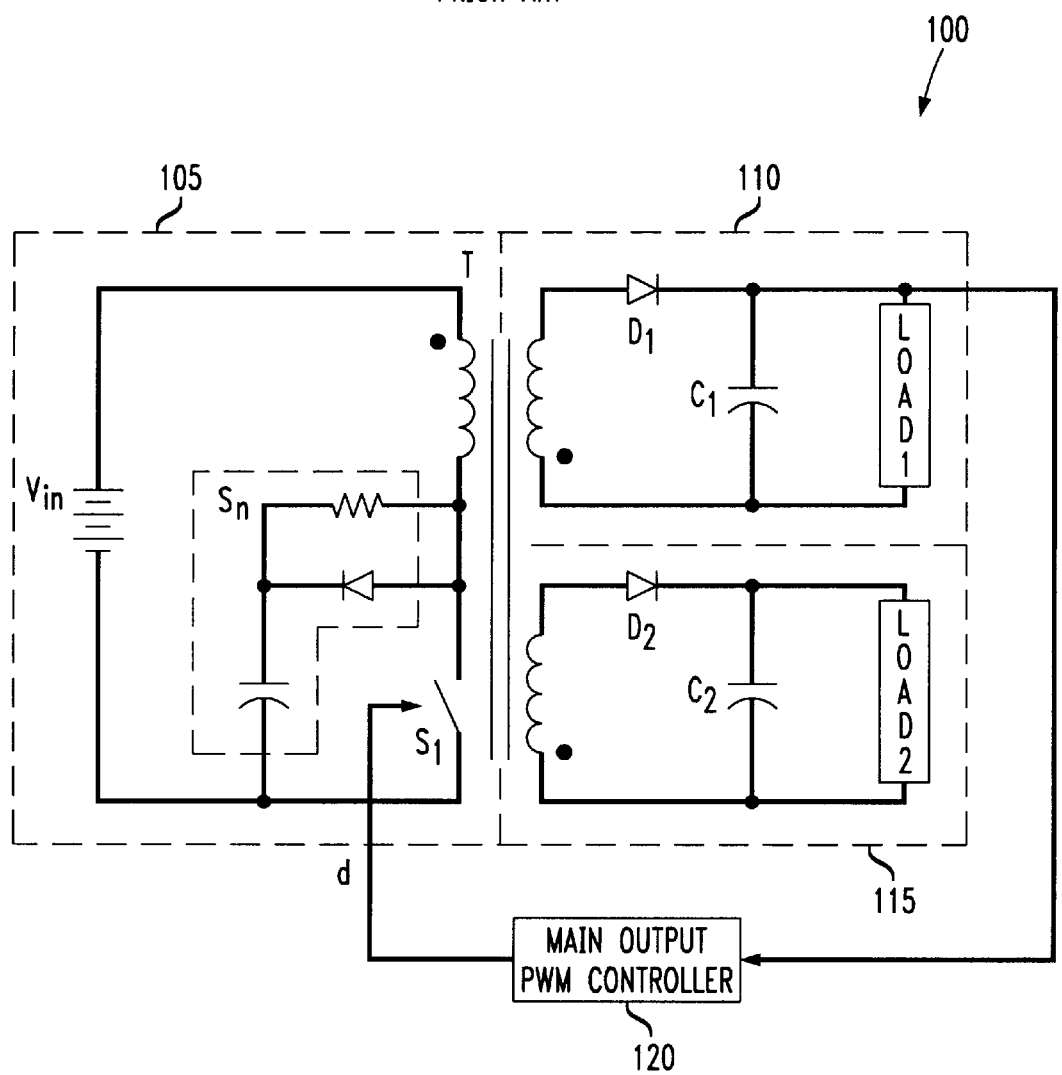
FIG. 1 illustrates a conventional multiple output flyback converter in which the cross-regulated output circuit thereof is subject to substantial voltage excursion.

Referring initially to FIG. 1, illustrated is a conventional multiple output flyback converter 100 in which the cross-regulated output circuit thereof is subject to substantial voltage excursion. The multiple output flyback converter 100 includes a primary circuit 105, a main regulated output circuit 110, a cross-regulated output circuit 115 and a modulator 120. The primary circuit 105, includes a primary winding of a transformer T coupled to a main switch S1, an input voltage Vin and a snubber circuit Sn. The main regulated output circuit 110, coupled to the first secondary winding of the transformer T, includes a diode D1, a capacitor C1 and an output load LOAD1. The cross-regulated output circuit 115, coupled to the second secondary winding of the transformer T, includes a diode D2, a capacitor C2 and an output load LOAD2. The modulator 120 is, in the illustrated embodiment, a pulse width modulator (PWM), coupled to the main switch S1, which controls the regulation of the output voltage of the main regulated output circuit 110.

Regulation of the cross-regulated output circuit 115 occurs indirectly in the multiple output flyback converter 100. This cross-regulation attribute typically provides acceptable performance until the output load LOAD2 becomes small. For example, a five percent regulation for the of main regulated output circuit 110 would result in about a ten percent regulation, for larger output load currents, in the cross-regulated output circuit 115. The output voltage of a lightly loaded cross-regulated output circuit 115 however, tends to become disproportionately higher. This occurs because flyback converters, in general, exhibit a ringing in their voltage switching waveforms due to resonances that are generated by the parasitic inductances of the transformer T and capacitances associated with the main switch S1 or capacitors in the snubber circuit Sn. The capacitor C2 in the cross-regulated output circuit 115 operates in a "peak-charge" mode and is therefore particularly susceptible to being overly-charged by the ringing voltage. This action may cause the lightly loaded output voltage regulation of the cross-regulated output circuit 115 to deteriorate to a value of 50%, which is unacceptable in most applications.

Typical solutions to overcome the output voltage regulation deterioration include the addition of a bleeder load resistor to the output of the cross-regulated output circuit 115. This load resistor establishes a minimum load current that is large enough to minimize (damp) the voltage ringing and maintain the output voltage regulation at an acceptable level. However, addition of the bleeder load resistor reduces the overall converter efficiency and even becomes impractical if the converter's input voltage Vin is a battery. Another solution is to use a linear regulator as a post regulator on the cross-regulated output circuit 115. The linear regulator is also somewhat lossy and is therefore subject to the same disadvantages as the bleeder load resistor.

Figure 2:
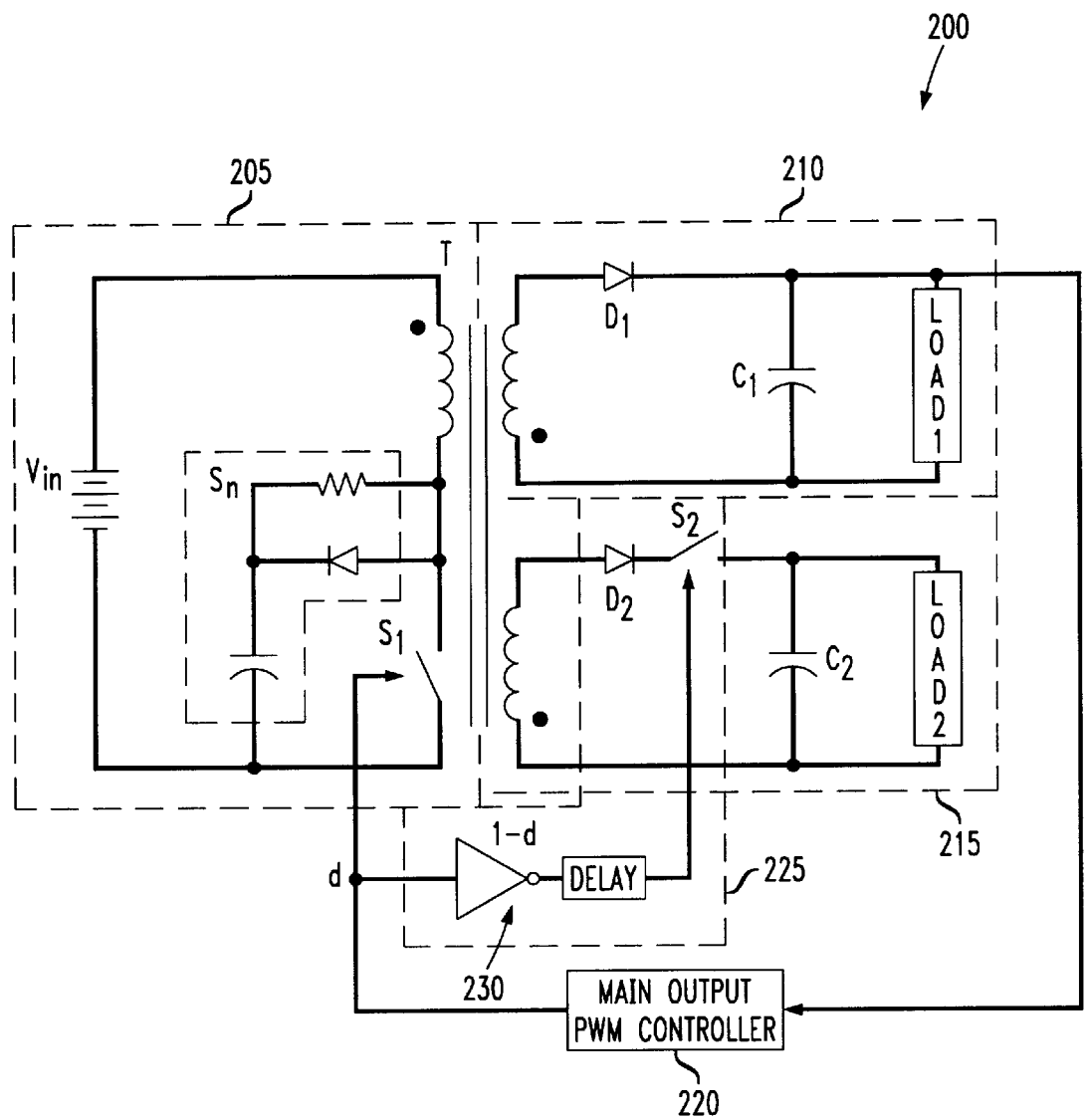
FIG. 2 illustrates a multiple output flyback converter that incorporates a voltage excursion controller constructed according to the principles of the present invention.

Turning now to FIG. 2, illustrated is a multiple output flyback converter 200 that incorporates a voltage excursion controller constructed according to the principles of the present invention. The multiple output flyback converter 200 includes a primary circuit 205, a main regulated output circuit 210, a cross-regulated output circuit 215, a modulator 220 and a voltage excursion controller 225.

The primary circuit 205, includes a primary winding of a transformer T coupled to a main switch S1, an input voltage Vin and a snubber circuit Sn. The main regulated output circuit 210, coupled to the first secondary winding of the transformer T, includes a diode D1, a capacitor C1 and an output load LOAD1. The cross-regulated output circuit 215, coupled to the second secondary winding of the transformer T, includes a diode D2, a capacitor C2 and an output load LOAD2. The modulator 220 is a pulse width modulator (PWM), coupled to the main switch S1, which provides a main switch control signal, having a duty cycle d, to the main switch S1 and controls the regulation of the output voltage of the main regulated output circuit 210.

The voltage excursion controller 225 includes a delay circuit 230 coupled to the modulator 220, that generates a delay signal DELAY based on the main switch control signal, and an auxiliary switch S2, associated with the cross-regulated output circuit 215, that receives the delay signal DELAY and opens to isolate at least a portion of the ringing within the cross-regulated output circuit 215. In the example shown in FIG. 2, the auxiliary switch S2 may be an n-channel field effect transistor (FET). If a p-channel FET were used, the delay signal DELAY could be derived directly from the output of the modulator 220.

The present invention therefore introduces the broad concept of isolating the ringing that occurs under a light output load condition in the cross-regulated output circuit 215 of the multiple output flyback converter 200 to moderate the output voltage excursion that would otherwise result. The voltage excursion controller 225 operates effectively under light load conditions to isolate substantially all of the effects of ringing, allowing the output voltage of the cross-regulated output circuit 215 to remain within about 10% of the desired output voltage for all output load conditions.

The delay circuit 230 comprises a signal inverter that generates a signal complementary in terms of duty cycle (1−d) to the main switch control signal. The complementary signal is then delayed (employing any conventional signal delay circuit) to provide the resulting delay signal DELAY to the auxiliary switch S2. The delay circuit 230 may provide a delay of fixed duration or it may be designed to provide a controllable delay for some applications, perhaps based on a feedback attribute of the ringing itself. In the embodiment illustrated, the auxiliary switch S2 is coupled between a diode D2 and a capacitor C2 of the cross-regulated output circuit 215. Of course, the auxiliary switch S2 can be located in other parts of the cross-regulated output circuit 215. The modulator 220 is shown to be a PWM. However, the delay circuit 230 of the present invention is equally applicable to main switch control signals generated by other conventional or later-developed switch modulators.

Figure 3:
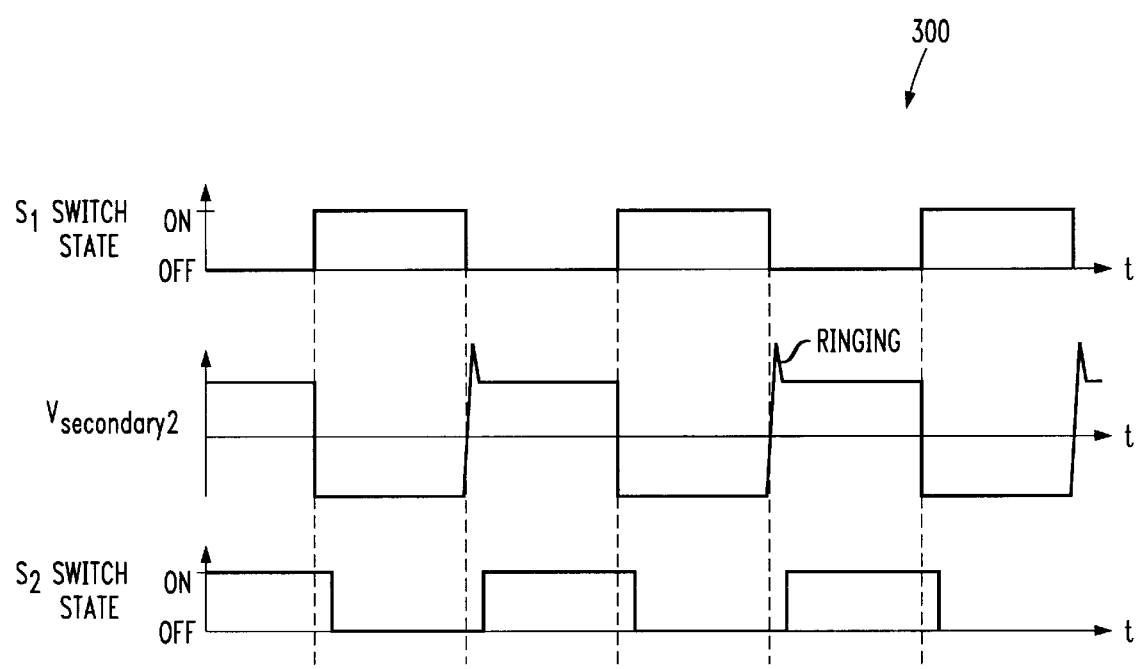
FIG. 3 illustrates a timing diagram setting forth the operation of the voltage excursion controller of FIG. 2 in greater detail.

Turning now to FIG. 3, illustrated is a timing diagram 300 setting forth the operation of the voltage excursion controller 225 of FIG. 2 in greater detail. The timing diagram 300 includes waveforms showing the state of the main switch S1, a voltage $V_{secondary2}$ of the second secondary winding of the transformer T and the state of the auxiliary switch S2.

As the main switch Si switches from ON to OFF, the voltage $V_{secondary2}$ shows the ringing as an over-voltage spike that would affect the regulation of the cross-regulated output circuit 215, if not for the fact that the auxiliary switch S2 is OFF. This condition serves to isolate the ringing of the voltage $V_{secondary2}$ from the cross-regulated output circuit

215. The auxiliary switch S2 changes from OFF to ON after the ringing has subsided, which maintains the regulation of the cross-regulated output circuit 215, even at low output load values.

From the above, it is apparent that the present invention provides, for use with a flyback converter having a modulator for providing a main switch control signal thereto and main and cross-regulated output circuits, the cross-regulated output circuit subject to ringing and resulting voltage excursion, a voltage excursion controller and a method of operating the same. In one embodiment, the controller includes: (1) a delay circuit, coupled to the modulator, that generates a delay signal based on the main switch control signal and (2) an auxiliary switch, associated with the cross-regulated output circuit, that receives the delay signal and opens to isolate at least a portion of the ringing within said cross-regulated output circuit.

Although the present invention has been described in detail, those skilled in the art should understand that they can make various changes, substitutions and alterations herein without departing from the spirit and scope of the invention in its broadest form.

What is claimed is:

1. For use with a flyback converter having a modulator for providing a main switch control signal thereto and main and cross-regulated output circuits, said cross-regulated output circuit subject to ringing and resulting voltage excursion, a voltage excursion controller, comprising:

a delay circuit, coupled to said modulator, that generates a delay signal based on said main switch control signal; and an auxiliary switch, associated with said cross-regulated output circuit, that receives said delay signal and opens to isolate at least a portion of said ringing within said cross-regulated output circuit.

2. The controller as recited in claim 1 wherein said delay circuit comprises a signal inverter that generates a signal complementary to said main switch control signal.

3. The controller as recited in claim 1 wherein said delay circuit provides a delay of fixed duration.

4. The controller as recited in claim 1 wherein said auxiliary switch is coupled between a diode and a capacitor of said cross-regulated output circuit.

5. The controller as recited in claim 1 wherein said auxiliary switch opens to isolate all of said ringing.

6. The controller as recited in claim 1 wherein said auxiliary switch moderates said voltage excursion to within about 10% at light load.

7. The controller as recited in claim 1 wherein said modulator is a pulse-width modulator (PWM).

8. For use with a flyback converter having a modulator for providing a main switch control signal thereto and main and cross-regulated output circuits, said cross-regulated output circuit subject to ringing and resulting voltage excursion, a method of controlling said voltage excursion, comprising:

generating a delay signal based on said main switch control signal; and employing said delay signal to isolate at least a portion of said ringing within said cross-regulated output circuit.

9. The method as recited in claim 8 wherein said generating comprises generating a signal complementary to said main switch control signal.

10. The method as recited in claim 8 wherein said generating comprises providing a delay of fixed duration.

11. The method as recited in claim 8 wherein said employing comprises isolating said at least said portion from a capacitor of said cross-regulated output circuit.

12. The method as recited in claim 8 wherein said employing comprises isolating all of said ringing.

13. The method as recited in claim 8 wherein said employing comprises moderating said voltage excursion to within about 10% at light load.

14. The method as recited in claim 8 wherein said modulator is a pulse-width modulator (PWM).

15. A flyback converter, comprising:

a main switch;

a transformer having a primary winding coupled to said main switch and first and second secondary windings;

a main regulated output circuit coupled to said first secondary winding;

a cross-regulated output circuit coupled to said second secondary winding and subject to ringing and resulting voltage excursion;

a modulator that provides a main switch control signal to said main switch; and a voltage excursion controller, including:

a delay circuit, coupled to said modulator, that generates a delay signal based on said main switch control signal, and an auxiliary switch, associated with said cross-regulated output circuit, that receives said delay signal and opens to isolate at least a portion of said ringing within said cross-regulated output circuit.

16. The flyback converter as recited in claim 15 wherein said delay circuit comprises a signal inverter that generates a signal complementary to said main switch control signal.

17. The flyback converter as recited in claim 15 wherein said delay circuit provides a delay of fixed duration.

18. The flyback converter as recited in claim 15 wherein said auxiliary switch is coupled between a diode and a capacitor of said cross-regulated output circuit.

19. The flyback converter as recited in claim 15 wherein said auxiliary switch opens to isolate all of said ringing.

20. The flyback converter as recited in claim 15 wherein said auxiliary switch moderates said voltage excursion to within about 10% at light load.

21. The flyback converter as recited in claim 15 wherein said modulator is a pulse-width modulator (PWM).

* * * * *